(12) United States Patent
Masson et al.

(10) Patent No.: US 8,459,417 B2
(45) Date of Patent: Jun. 11, 2013

(54) SHOCK-ABSORBER FOR AIRCRAFT LANDING GEAR

(75) Inventors: Richard Masson, Buc (FR); Stéphane Picard, Freville-en-Gatinais (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 542 days.

(21) Appl. No.: 12/664,549

(22) PCT Filed: Jun. 12, 2008

(86) PCT No.: PCT/FR2008/000799
§ 371 (c)(1),
(2), (4) Date: Apr. 13, 2010

(87) PCT Pub. No.: WO2009/010643
PCT Pub. Date: Jan. 22, 2009

(65) Prior Publication Data
US 2010/0187353 A1   Jul. 29, 2010

(30) Foreign Application Priority Data

Jun. 15, 2007   (FR) ..................................... 07 04306

(51) Int. Cl.
*F16F 9/48*   (2006.01)
(52) U.S. Cl.
USPC ...... 188/284; 188/269; 188/313; 244/104 FP; 267/64.26
(58) Field of Classification Search
USPC ............ 188/284, 269, 313; 267/64.12, 64.26, 267/64.18, 64.22; 244/104 FP
See application file for complete search history.

(56) References Cited

U.S. PATENT DOCUMENTS

| 2,069,791 | A | * | 2/1937 | Wallace | 267/64.22 |
|---|---|---|---|---|---|
| 2,618,478 | A | * | 11/1952 | Conway | 267/64.13 |
| 2,909,368 | A |   | 10/1959 | Taylor | |
| 2,933,310 | A | * | 4/1960 | Schnitzer | 267/64.22 |
| 3,056,598 | A | * | 10/1962 | Ransom et al. | 267/64.26 |
| 3,290,037 | A | * | 12/1966 | Williams et al. | 267/64.26 |
| 3,540,683 | A |   | 11/1970 | Foster | |
| 3,888,436 | A | * | 6/1975 | Sealey | 244/104 FP |
| 4,082,255 | A | * | 4/1978 | Masclet et al. | 267/64.28 |
| 4,088,286 | A | * | 5/1978 | Masclet et al. | 244/102 SL |
| 4,284,255 | A | * | 8/1981 | Masclet et al. | 244/102 R |
| 4,291,850 | A | * | 9/1981 | Sharples | 244/102 SS |

(Continued)

FOREIGN PATENT DOCUMENTS

| EP | 1574427 | 9/2005 |
|---|---|---|
| EP | 1588939 | 10/2005 |

*Primary Examiner* — Robert A Siconolfi
*Assistant Examiner* — Mariano Sy
(74) *Attorney, Agent, or Firm* — Sughrue Mion, PLLC

(57) ABSTRACT

The invention relates to a shock-absorber for aircraft landing gear, the shock-absorber having two elements mounted to slide telescopically one in the other and defining an internal volume that is filled with hydraulic fluid and with gas, the internal volume being separated into at least two chambers by a separation including at least one throttling orifice through which the hydraulic fluid passes from one chamber to the other while the shock-absorber is being compressed. According to the invention, the separation includes at least one degassing orifice to enable gas to be transferred from one chamber to the other when the landing gear is in the deployed position, the degassing orifice being offset vertically relative to the throttling orifice so as to be located above it when the landing gear is in the deployed position.

4 Claims, 3 Drawing Sheets

U.S. PATENT DOCUMENTS

| | | | | |
|---|---|---|---|---|
| 4,381,857 A | * | 5/1983 | Cook | 267/64.15 |
| 4,405,119 A | * | 9/1983 | Masclet et al. | 267/64.22 |
| 4,445,672 A | * | 5/1984 | Turiot | 267/64.16 |
| 4,506,869 A | * | 3/1985 | Masclet et al. | 267/64.15 |
| 4,552,324 A | * | 11/1985 | Hrusch | 244/104 FP |
| 4,749,152 A | * | 6/1988 | Veaux et al. | 244/104 FP |
| 4,886,248 A | * | 12/1989 | Delhaye et al. | 267/64.26 |
| 4,995,597 A | * | 2/1991 | Hatton | 267/64.15 |
| 5,094,407 A | * | 3/1992 | Jampy et al. | 244/104 FP |
| 5,271,314 A | * | 12/1993 | Derrien | 92/8 |
| 5,294,077 A | * | 3/1994 | Derrien | 244/104 FP |
| 5,310,140 A | * | 5/1994 | Veaux et al. | 244/104 FP |
| 7,204,456 B2 | * | 4/2007 | Courtois et al. | 244/104 FP |

* cited by examiner

SHOCK-ABSORBER FOR AIRCRAFT LANDING GEAR

CROSS-REFERENCE TO RELATED APPLICATIONS

This application is entitled to the benefit of and incorporates by reference essential subject matter disclosed in International Application No. PCT/FR2008/000799 filed on Jun. 12, 2008 and French Patent Application No. 07 04306 filed on Jun. 15, 2007.

FIELD OF THE INVENTION

The invention relates to a landing gear shock-absorber with fast fluid transfer.

BACKGROUND OF THE INVENTION

Landing gear includes shock-absorbers that present various chambers that are separated by various walls or separations presenting throttling orifices and that are filled with hydraulic fluid and with gas under pressure. When landing gear is in a deployed position, a shock-absorber is generally in a substantially vertical position such that, as a result of the difference in density, the gas and the hydraulic fluid in the shock-absorber are to be found respectively at the top and at the bottom thereof.

Nevertheless, when the landing gear is in a folded position in a wheel bay of the aircraft, the hydraulic fluid and the gas progressively spread out in the various chambers of the shock-absorber by passing through the throttling orifices. In particular, the gas occupies part of a chamber known as the oil chamber that is situated beneath the separation, referred to as the "diaphragm", that subdivides the inside of the shock-absorber. When the landing gear is moved into its deployed position prior to landing, the hydraulic fluid and the gas under pressure migrate so as to return progressively to their initial state, by passing through the throttling orifices. Nevertheless, this return to the initial state can take quite a long time, such that under certain circumstances, it can happen that the aircraft lands before the hydraulic fluid has had time to fill completely the oil chamber situated under the diaphragm.

OBJECT OF THE INVENTION

An object of the invention is to provide a shock-absorber that enables the fluids (oil or gas) to return quickly to their nominal positions appropriate for landing, in which the chamber that lies under the diaphragm is filled solely with hydraulic fluid.

BRIEF SUMMARY OF THE INVENTION

According to the invention, there is provided a shock-absorber for aircraft landing gear, the shock-absorber having two elements mounted to slide telescopically one in the other and defining an internal volume that is filled with hydraulic fluid and with gas, the internal volume being separated into at least two chambers by a separation including at least one throttling orifice through which the hydraulic fluid passes from one chamber to the other while the shock-absorber is being compressed. According to the invention, the separation includes at least one degassing orifice to enable gas to be transferred from one chamber to the other when the undercarriage is in the deployed position, the degassing orifice being offset vertically relative to the throttling orifice so as to be located above it when the landing gear is in the deployed position.

The hydraulic fluid that stagnates above the separation and that needs to return under the separation by gravity can then pass either via the throttling orifice or via the degassing orifice. The pressure of the fluid at the throttling orifice is higher than the pressure that exists in the fluid at the level of the degassing orifice because of the difference in height. The hydraulic fluid thus passes preferentially through the throttling orifice while the gas that is to be found under the separation passes preferentially via the degassing orifice. This specialization of the orifices enables the fluids to be transferred much more quickly, thereby considerably shortening the time required for returning to the nominal situation in which the chamber under the separation is filled solely with hydraulic fluid.

BRIEF DESCRIPTION OF THE DRAWINGS

The invention can be better understood in the light of the following description with reference to the figures of the drawings, in which.

DETAILED DESCRIPTION OF THE INVENTION

Figure 1:
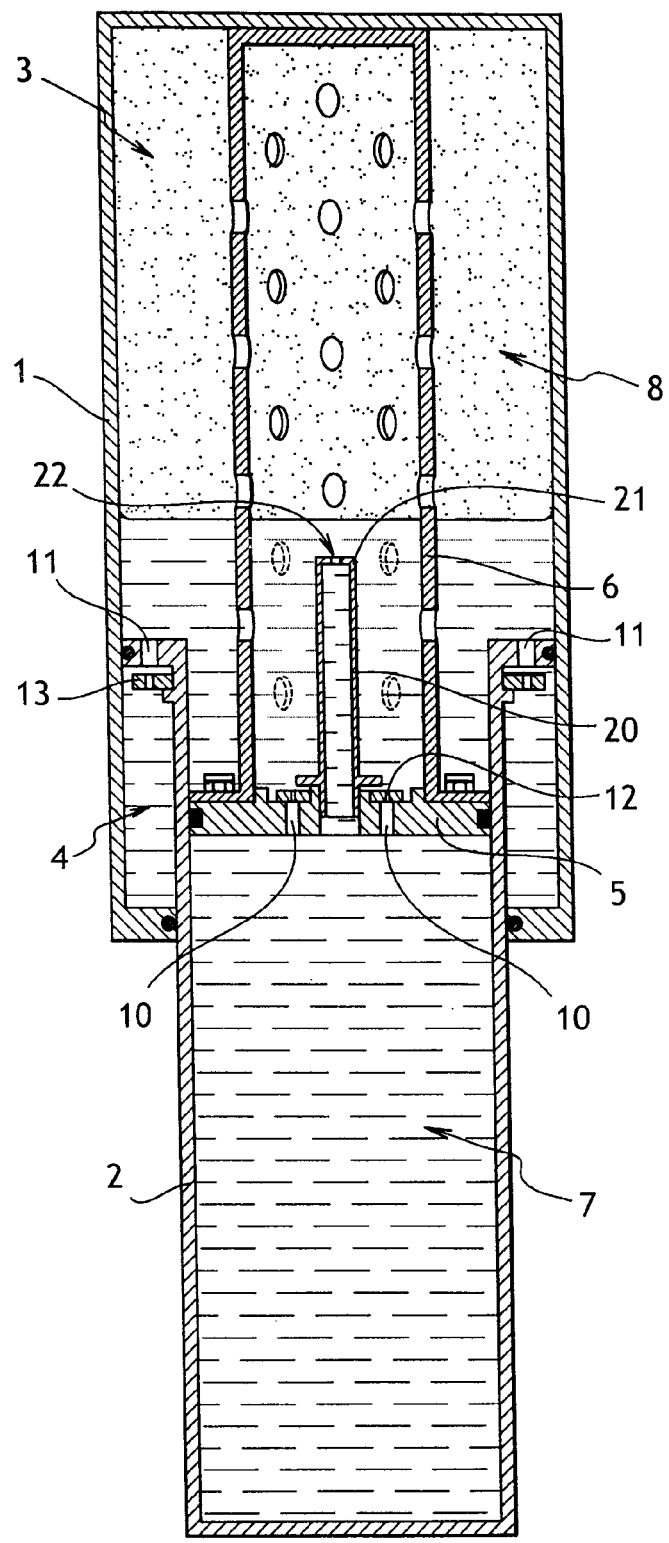
FIG. 1 is a section view of an aircraft landing gear shock-absorber, in its nominal landing situation.

With reference to FIG. 1, the shock-absorber comprises a strut 1 in which a rod 2 is mounted to slide telescopically. Between them, the strut 1 and the rod define firstly a main volume 3 and secondly an annular chamber 4, both of volumes that vary when the rod 2 slides in the strut 1.

A separation or diaphragm 5 carried by a dip tube 6 subdivides the main volume 3 into two chambers: firstly an oil chamber 7 that extends under the diaphragm 5 and that is defined by the rod 2; and secondly an air chamber 8 that extends above the diaphragm 5.

The inside of the shock-absorber is filled with hydraulic fluid (symbolized by short horizontal lines) and with gas (symbolized by dots). The hydraulic fluid fills the oil chamber 7, the annular chamber 4, and a fraction of the air chamber 8. The remainder of the air chamber 8 is filled with gas under pressure.

While the shock-absorber is being compressed, hydraulic fluid passes through throttling orifices 10 formed in the diaphragm 5 from the oil chamber 7 to the air chamber 8. Simultaneously, hydraulic fluid passes through throttling orifices 11 in the rod 2 from the air chamber 8 to the annular chamber 4.

Transfers in the opposite direction take place when the shock-absorber extends. In this respect, valve members 12 and 13 cover the throttling orifices 10 and 11 to limit the flow diameter and thus control the rate at which the shock-absorber extends.

According to the invention, the diaphragm 5 carries a hollow column 20, in a central position in this example, that extends upwards into the air chamber 8 (when the landing gear is in its deployed position, ready for landing and as shown). The column 20 projects a considerable distance into the air chamber 8 and it is terminated at its top end by a partition 21 that includes a degassing orifice 22, of section in this example that is smaller than the section of the throttling orifices.

Figure 3:
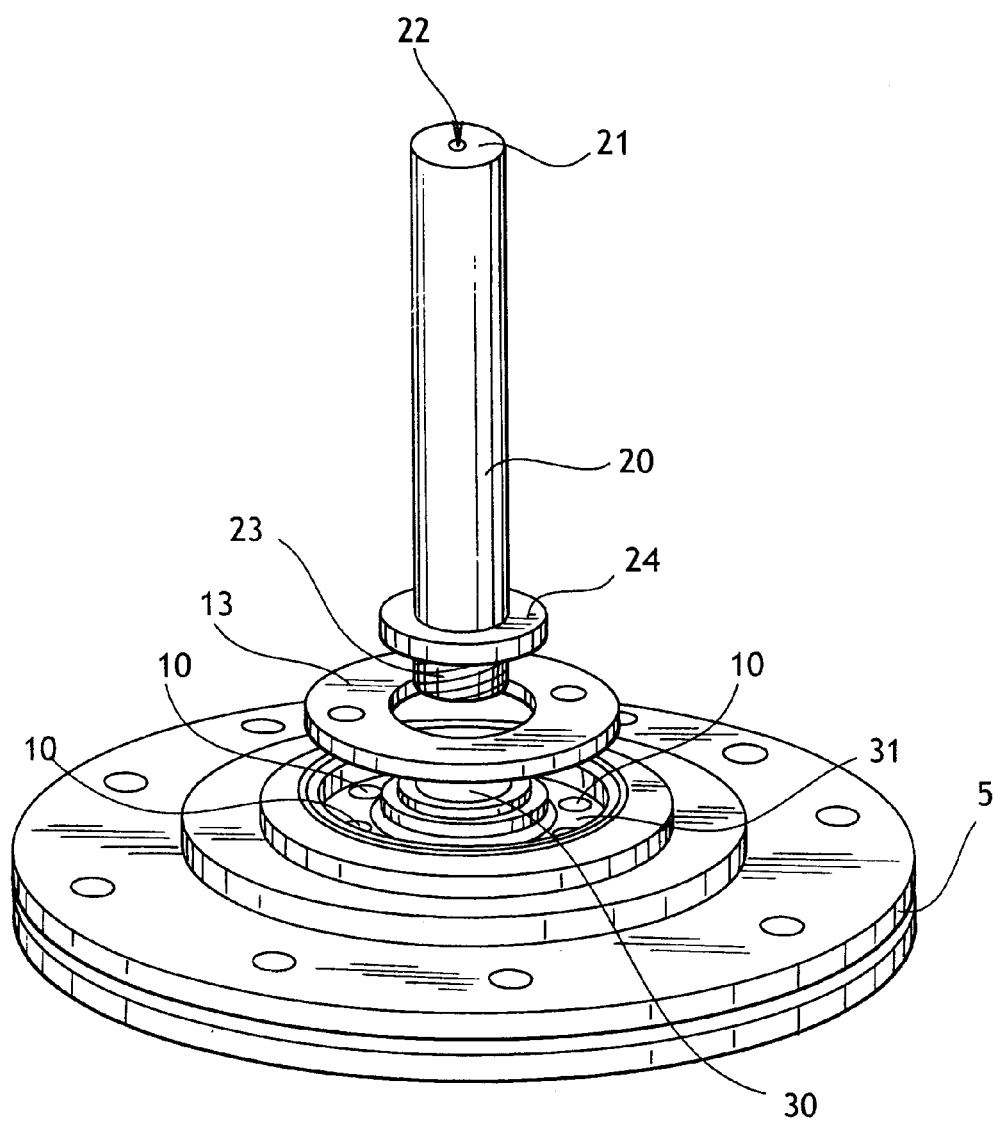
FIG. 3 is a fragmentary perspective view showing the diaphragm and the column that are fitted to the shock-absorber of FIGS. 2 and 3.

As can be seen more clearly in FIG. 3, the diaphragm 5 includes a central tapped hole 30 for receiving the threaded bottom end 23 of the column 20. In this example, the column 20 has a collar 24 for holding captive the valve member 13 between the collar 24 and a seat 31 of the diaphragm 5 between which the valve member 13 moves vertically depending on the flow direction of the hydraulic fluid passing through the throttling orifices 10.

Figure 2:
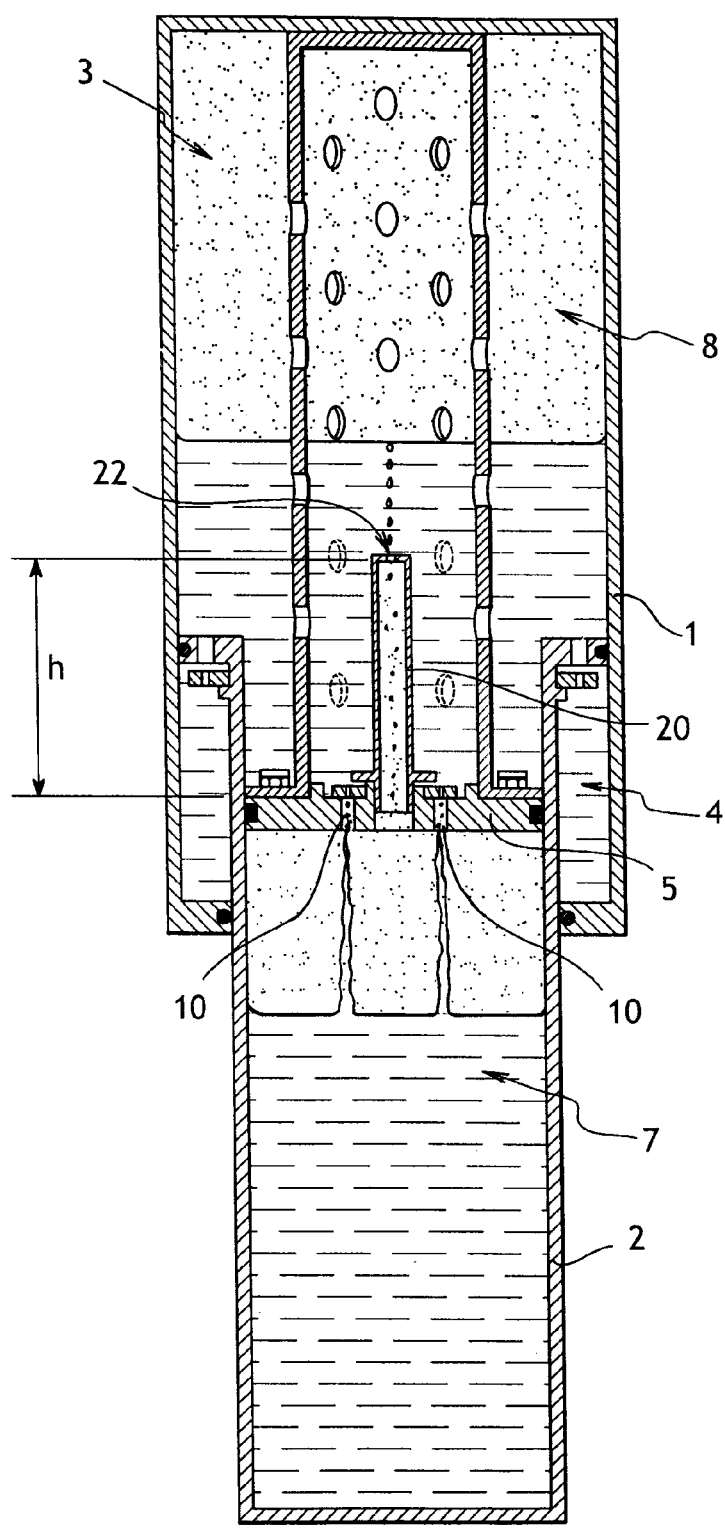
FIG. 2 is a section view analogous to that of FIG. 1, showing the situation of the fluids inside the shock-absorber immediately after the landing gear has been deployed.

The operation of the device is explained below with reference to FIG. 2. This figure shows the state of the shock-absorber when the landing gear has just been deployed. The landing gear has been in a folded position at an angle lying typically in the range 80° to 110°, perhaps for a period of several hours, and the fluids (oil or gas) have had the time to spread throughout the shock-absorber, with the gas above the hydraulic fluid. On being deployed, the gas located under the diaphragm 5 remains trapped in the oil chamber 7 and it is appropriate to allow enough time for gravity to return the gas to the air chamber 8.

In this example, between the throttling orifices 10 and the degassing orifice 22 there is a height difference h such that the pressure that exists in the fluid in the throttling orifices 10 is slightly greater than the pressure that exists in the fluid at the degassing orifice 22.

This small pressure difference encourages the hydraulic fluid to flow through the throttling orifices 10, thereby causing the gas to flow preferentially via the degassing orifice 22. Experiments have shown that the time required for the hydraulic fluid and the gas to pass through is considerably reduced in comparison with a shock-absorber that does not have a vertically offset degassing orifice, and the saving in time can be as much as several minutes.

The height of the column is preferably such that the degassing orifice remains immersed in the hydraulic fluid, even when the hydraulic fluid completely fills the oil chamber 7, as shown in FIG. 1.

The invention is not limited to the above description, but on the contrary covers any variant coming within the ambit defined by the claims.

In particular, although it is stated that the separation carrying the column is the diaphragm of the shock-absorber, any other separation could be fitted with the column of the invention, for example, the separation between the air chamber 8 and the annular chamber 4.

Naturally, a plurality of degassing orifices could be provided carried on one or more columns. The central location for the column as shown in this example is not limiting, and the column could be located elsewhere on the separation.

Finally, although a separate, fitted column is shown, it would naturally be possible in equivalent manner to propose a separation that is made as a single piece, and that presents at least one degassing orifice that is vertically offset so as to be above the throttling orifices when the landing gear is in the deployed position. When using a two-part construction, it is also possible to fit the column on the separation in any known manner, e.g. by welding, or by a connection involving a nut.

What is claimed is:

1. A shock-absorber for aircraft landing gear, the shock-absorber having two elements (1, 2) mounted to slide telescopically one in the other and defining an internal volume that is filled with hydraulic fluid and with gas, the internal volume being separated into at least two chambers (7, 8) by a separation (5) including at least one throttling orifice (10) through which the hydraulic fluid passes from one chamber to the other, while the shock-absorber is being compressed, wherein the separation includes at least one degassing orifice to enable gas to be transferred from one chamber to the other when the landing gear is in a deployed position, the degassing orifice being offset vertically relative to the throttling orifice so as to be located above said throttling orifice when the landing gear is in the deployed position, wherein the degassing orifice is provided at the top end of a hollow column (20) that is carried by the separation and that opens out into the chamber (7) lying beneath the separation (5).

2. The shock-absorber according to claim 1, wherein the column is fitted on the separation (5) and includes a collar (24) for retaining a slidably-mounted valve member (12) that co-operates with the throttling orifice (10) in the separation (5).

3. The shock-absorber according to claim 2, wherein the column is screwed into the separation.

4. A shock-absorber for aircraft landing gear, the shock-absorber having two elements (1, 2) mounted to slide telescopically one in the other and defining an internal volume that is filled with hydraulic fluid and with gas, the internal volume being separated into at least two chambers (7, 8) by a separation (5) including at least one throttling orifice (10) through which the hydraulic fluid passes from one chamber to the other, while the shock-absorber is being compressed, wherein the separation includes at least one degassing orifice to enable gas to be transferred from one chamber to the other when the landing gear is in a deployed position, the degassing orifice being offset vertically relative to the throttling orifice so as to be located above said throttling orifice when the landing gear is in the deployed position, wherein the degassing orifice is of a height such that said degassing orifice remains immersed in the hydraulic fluid, even when the chamber extending under the separation is completely filled with hydraulic fluid.

* * * * *